United States Patent [19]
Wilcox

[11] Patent Number: 5,182,981
[45] Date of Patent: Feb. 2, 1993

[54] REVOLVING PEANUT ROASTING APPARATUS

[76] Inventor: Robert Wilcox, 1271 Driftwood Ave., Clearwater, Fla. 34624

[21] Appl. No.: 907,371

[22] Filed: Jul. 1, 1992

[51] Int. Cl.$^5$ .................. A47J 27/62; A47J 37/04; A47J 37/06; F26B 19/00

[52] U.S. Cl. .................................. 99/333; 34/63; 34/133 R; 34/139; 99/348; 99/479; 99/483; 219/389; 366/146; 366/227; 366/232

[58] Field of Search .............. 99/331, 332, 333, 334, 99/335, 323.5, 348, 450, 470, 476, 479, 483; 366/227, 234, 232, 146; 34/63, 133 R, 133 G, 139; 219/389, 400; 432/27, 112

[56] References Cited

U.S. PATENT DOCUMENTS

| | | | |
|---|---|---|---|
| 1,789,428 | 1/1931 | Deschenes et al. | |
| 2,360,460 | 10/1944 | Williams | 366/234 |
| 2,360,838 | 10/1944 | Atti | 34/63 |
| 2,639,133 | 5/1953 | Clary | |
| 3,146,109 | 8/1964 | Frondorf | 99/93 |
| 3,253,533 | 5/1966 | Benson | 99/443 R |
| 3,368,278 | 2/1968 | Opie | 366/232 |
| 3,958,304 | 5/1976 | Barbee | 366/227 |
| 4,048,473 | 9/1977 | Burkhart | 219/389 |
| 4,120,981 | 10/1978 | Burkhart | 99/427 |
| 4,193,758 | 3/1980 | Peterson et al. | 432/27 |
| 4,301,717 | 11/1981 | Knees | 99/348 |
| 4,369,585 | 1/1983 | Berkoff et al. | 34/63 |
| 4,444,509 | 4/1984 | Steiner et al. | 366/227 |
| 4,450,758 | 5/1984 | Belinkoff et al. | 99/332 |
| 4,721,036 | 1/1988 | Brandt et al. | 99/348 |
| 4,901,633 | 2/1990 | Delonghi | 99/409 |

FOREIGN PATENT DOCUMENTS

| 711378 | 9/1931 | France | 366/232 |
|---|---|---|---|
| 7801940 | 8/1979 | Netherlands | 99/427 |

*Primary Examiner*—Timothy F. Simone
*Attorney, Agent, or Firm*—Herbert W. Larson

[57] ABSTRACT

An outer cylindrical stationary housing is mounted on a support frame. An inner removable rotating drum mounted at an angle of 6-7 degrees from the base of the apparatus is turned by a shaft driven by an electric motor turning the shaft at 2-4 rpm. A heater element maintains about 350 degrees F in the rotating drum to roast nuts and multiple vanes mounted within the inner rotating drum keep the nuts tumbling so that they are evenly heated.

15 Claims, 2 Drawing Sheets

REVOLVING PEANUT ROASTING APPARATUS

BACKGROUND OF THE INVENTION

1. Field of the Invention

This invention relates to a peanut roasting apparatus. More particularly, it refers to a removable revolving drum rotating within a stationary drum containing a heating element used to heat or roast various nuts.

2. Description of Prior Art

Many different apparatus have been suggested in the prior art for nut or bean roasting apparatus. These include U.S. Pat. Nos. 1,789,428; 2,639,133; 3,146,109; 4,193,758; 4,369,585; 4,901,633. Although all of the apparatus described contain various baskets and devices used for dry roasting beans or seeds of different sorts, none uses an angled removable basket with a heating element below the basket and the basket driven by a single shaft. An improved revolving peanut roasting apparatus for commercial and home use is needed.

SUMMARY OF THE INVENTION

I have invented an improved revolving peanut roasting apparatus that can be used to roast or heat peanuts, chestnuts, or any other kind of nut.

My revolving peanut roasting apparatus consists of an angled stationary drum housing mounted on a support frame. The stationary drum housing encloses a heating element and a cylindrical removable drum rotating on a single shaft driven by a motor. An adjustable timer regulates the length of time the apparatus operates in a given cycle. The cylindrical rotating drum contains a removable cover attached by two clips. The removable cover has a series of twelve circumferential holes in its face, to vent moisture. A plurality of blending vanes are mounted on the interior surface of the cylindrical rotating drum. The stationary drum housing has a series of air vents on the top and a series of air inlets on the bottom which promote hot air circulation.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
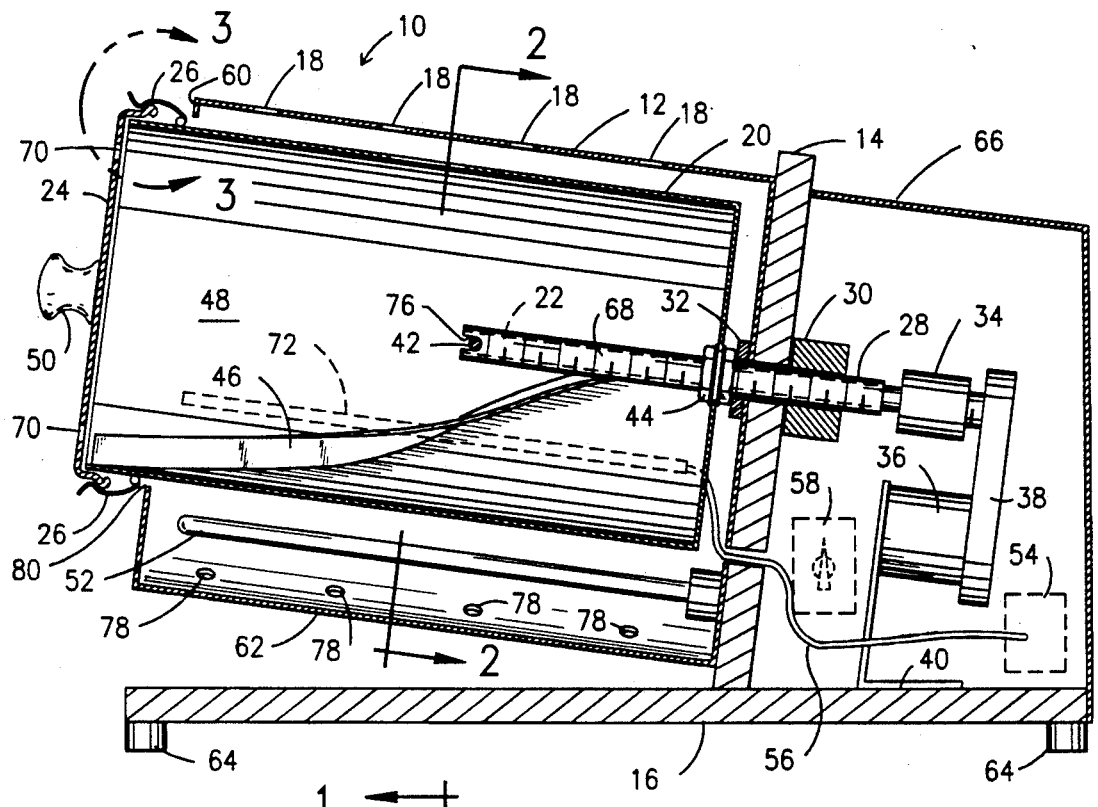
FIG. 1 is a side view partially in section along lines 1—1 of FIG. 2 of a revolving peanut roasting apparatus according to the invention.
Figure 2:
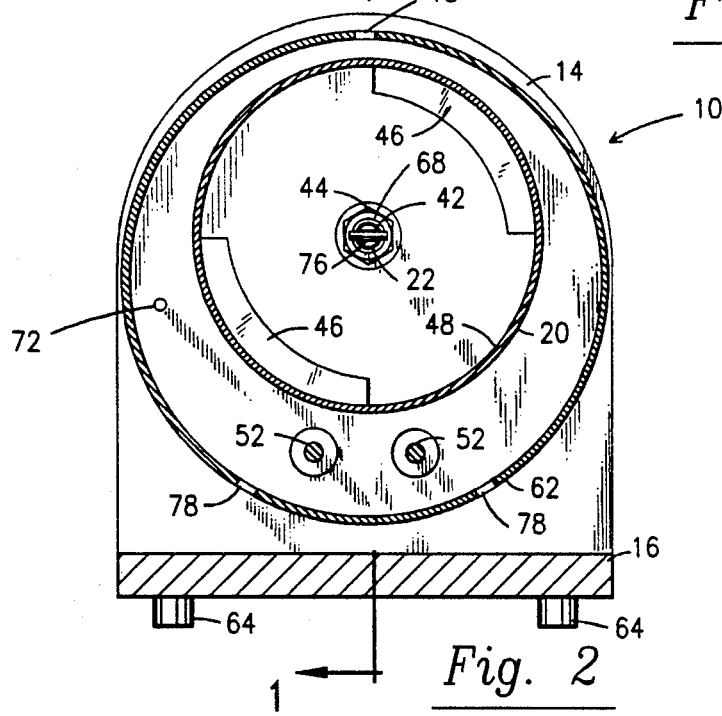
FIG. 2 is a front view partially in section along the lines 2—2 of FIG. 1.
Figure 3:
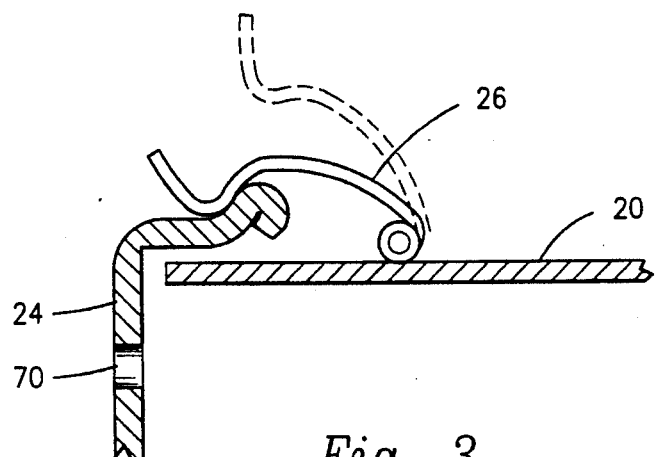
FIG. 3 is a side view partially in section of the cylindrical rotating drum cover clip along the lines 3—3 of FIG. 1.

Throughout the following detailed description, the same reference numerals refer to the same elements in all figures.

The revolving peanut roasting apparatus 10 shown in FIG. 1 has a stationary drum housing 12 mounted on a support frame 14 which in turn is mounted on a base 16. The front end 60 of stationary drum 12 has an offset annular opening 80 to provide access for the removable cylindrical rotating drum 20. A plurality of air vents 18 and air inlets 78 are located along the top and bottom respectively of the stationary drum housing 12. A cylindrical inner rotating drum 20 is mounted for rotation on a single shaft 22 within the stationary drum housing 12. A removable cover 24 attaches to the cylindrical inner rotating drum 20 by means of two cover clips 26. The removable cover 24 has a series of twelve circumferential moisture holes 70. The drive shaft 22 turns within a main shaft bearing 28 mounted within a bearing support 30 on the back of the support frame 14. A wear ring 32 separates the hollow drive hub 68 and main shaft bearing 28. A motor shaft coupling 34 provides engagement with the motor 36 and gear reduction unit 38. A motor mount 40 supports the motor 36. A drive pin 42 couples the hollow drive hub 68 to the drive shaft slot 76. The hollow drive hub 68 is affixed to the inner rotating drum 20 by locknuts 44.

At least two blending vanes 46 are attached to the inner wall 48 of the cylindrical inner rotating drum 20. The front cover 24 of the cylindrical inner drum 20 is fitted with a heat resistant handle 50 for convenient removal of the cover 24 along with inner rotating drum 20.

Figure 4:
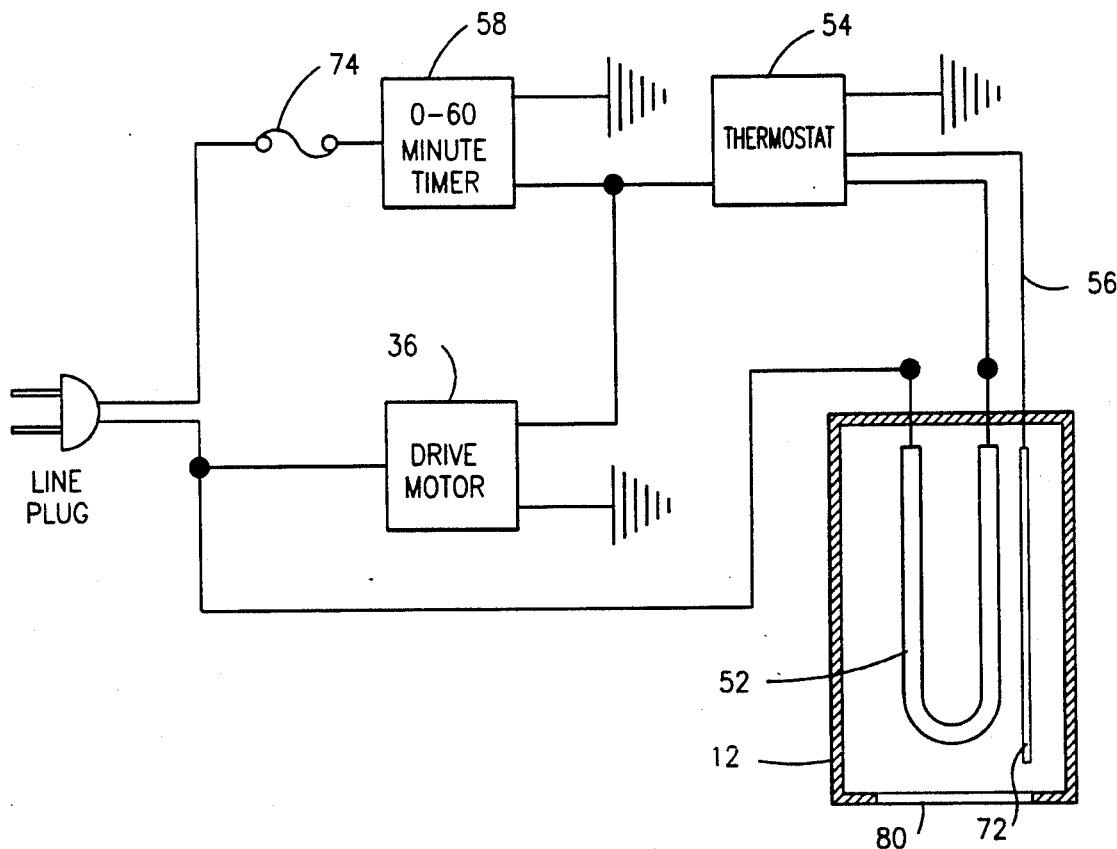
FIG. 4 is a circuit diagram of the electrical circuit employed in the invention.

A calrod heating element 52 is mounted on the support frame 14 and extends outwardly in a U-shape configuration beneath the cylindrical inner rotating drum 20. The schematic diagram of FIG. 4 shows the electrical system employed to heat element 52. A thermostat 54 controls the heat given off by heating element 52 and is connected to thermostat heat bulb 72 by a capillary tube 56. A 0-60 minute timer switch 58 controls the apparatus cycle. A high temperature cut-off switch 74 in the circuit as shown in FIG. 4, protects the peanut roasting apparatus in the event of a component failure.

Four vent holes 18 and eight air inlet holes 78 in stationary drum housing 12 are equally spaced top and bottom respectively on longitudinal centerlines. The stationary housing 12, inner rotating drum 20, and frame parts 14 and 16 are preferable made from a light weight steel or stainless steel. However, high temperature resistant plastics or aluminum can be used for some of the parts. The calrod heating element 52 generates between 900-1100 watts and the motor 36 has the capability of turning the shaft 22 at less than eight revolutions per minute. Preferred is 2 to 4 revolutions per minute. The temperature inside cylindrical inner rotating drum 20 will be maintained at 350 degrees F. by thermostat 54 for optimum roasting conditions. Peanuts will roast in about twenty minutes using my apparatus.

The heat shield at the bottom 62 of housing 12 should be at least twenty gauge steel to withstand the temperatures generated by the heating element 52. Legs 64 at the bottom of base 16 permits cooling air to circulate under the apparatus.

The angle of cylindrical inner rotating drum 20 from base 16 is preferably 6–7 degrees to optimize roasting conditions. The vanes 46 keep the peanuts tumbling within the rotating drum 20. These vanes can be spiral in shape as shown in FIG. 1 or can be mounted parallel within rotating drum 20.

The clips 26 provide easy access to the nuts within rotating drum 20. However, the cover 24 could be held in place by means such as screw threads or other holding means.

Vented cover 66 encloses the motor 36, thermostat 54, timer switch 58, and other elements of the apparatus located to the rear of support frame 14.

Equivalent elements can be substituted for the elements in my apparatus to obtain the same results in the same manner.

Having thus described the invention what is claimed and desired to be secured by Letters Patent is:

1. A revolving nut roasting apparatus comprising
   a cylindrical housing mounted at a first closed end on a support frame anchored to a flat base member, the cylindrical housing being at an acute angle with respect to the base member and having a plurality of air passage openings,
   a shaft driven by an electric motor at less than eight revolutions per minute, the shaft rotating within a bearing, mounted within a bearing support, attached to the support frame,
   the shaft having a drive slot through an end distal from the motor, the drive slot engaging a drive pin in a drive hub affixed to a base end of a removable rotating drum mounted on the shaft within, but spaced apart from, an inner wall of the cylindrical housing,
   multiple blending vanes attached to an inner wall of the removable rotating drum and a cover enclosing a front open end of the rotating drum,
   an electric heating apparatus element mounted on the support frame within a bottom portion of the cylindrical housing below the rotating drum so that nuts placed within the rotating drum can be slowly tumbled while being roasted.

2. A revolving nut roasting apparatus according to claim 1 wherein the cylindrical housing and rotating drum are mounted upward with respect to the base member at an angle of 6-7 degrees.

3. A revolving nut roasting apparatus according to claim 2 wherein there are four air vents and eight air inlets in the cylindrical housing.

4. A revolving nut roasting apparatus according to claim 1 wherein the heating element is a calrod U-shaped heating element.

5. A revolving nut roasting apparatus according to claim 4 wherein the heating element emits 900 to 1100 watts of energy and the temperature in the rotating drum is maintained at about 350 degrees F.

6. A revolving nut roasting apparatus according to claim 4 wherein a thermostat controls the heat output of the heating element.

7. A revolving nut roasting apparatus according to claim 1 wherein a pair of snap on clips retains the cover on the removable rotating drum, the clips mounted on an outer surface of the rotating drum adjacent the cover.

8. A revolving nut roasting apparatus according to claim 1 wherein the rotating drum removable cover has a series of moisture vent holes.

9. A revolving nut roasting apparatus according to claim 1 wherein a high temperature cut-off switch is located in an electrical circuit for the apparatus between a line plug leading to a source of electricity and the apparatus.

10. A revolving nut roasting apparatus according to claim 1 wherein an adjustable timer is located in an electric circuit between a line plug and both the motor and the heating element to control the time of operation of the heating element and motor.

11. A revolving nut roasting apparatus according to claim 10 wherein the adjustable timer permits operation of the heating element and motor for about twenty minutes to roast raw peanuts.

12. A revolving nut roasting apparatus according to claim 1 wherein the blending vanes are spiral shaped.

13. A revolving nut roasting apparatus according to claim 1 wherein the motor and attachments to the shaft are enclosed within a vented cover supported by the base.

14. A revolving nut roasting apparatus according to claim 1 wherein the cylindrical housing, support frame, base, and drum are made from steel.

15. A revolving nut roasting apparatus according to claim 14 wherein the steel is stainless.

* * * * *